Patented Aug. 7, 1951

2,562,978

UNITED STATES PATENT OFFICE 2,562,978

STARCH CARBAMATES

Ivan A. Wolff, Peoria, Ill., assignor to United States of America as represented by the Secretary of Agriculture No Drawing. Application November 25, 1947, Serial No. 788,079

12 Claims. (Cl. 260—233.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to new chemical compounds and more particularly to a new class of starch esters, namely, starch carbamates.

It is an object of this invention to provide a new class of starch carbamates possessing novel properties and which are advantageous in being capable of many uses not heretofore practicable with starch or starch derivatives.

Another object of this invention is to provide a process whereby this new class of starch charbamates may be prepared easily and economically.

Still another object of this invention is to provide new compositions of matter useful as dusting powders for surgical rubber equipment, as chemical intermediates, and as non-swelling starch derivatives.

According to the invention, starch granules in natural form are reacted with an organic isocyanate selected from the group consisting of monoisocyanates and diisocyanates in an inert solvent medium under substantially anhydrous conditions and at a temperature of about from 25° C. to the reflux temperature of the solvent employed. The resulting incompletely or completely esterified starch carbamates, which contain at least one carbamyl group for every 14 anhydroglucose units, are separated from the reaction mixture and dried to a powder. The reaction of starch with isocyanates follows the general type of reaction

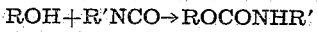

wherein R' is an organic radical.

Starch occurs naturally in the form of compact granules which are normally resistant to esterification unless pretreated to break up their organized structure. This pretreatment is sometimes called "activation" of the starch. I have discovered that isocyanates are unusual in that the esterification can be carried out with starch granules which have had no preswelling or other prior activation treatment.

In esterification reactions when more than one hydroxyl group is present in the substance to be esterified, polysubstitution is possible. Likewise, a di-functional esterifying material, in this case a polyfunctional isocyanate, is capable of reacting with more than one hydroxyl group. The following general type of reaction may be given as an illustration of the reaction of a diisocyanate with a hydroxyl bearing compound:

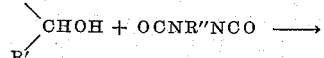

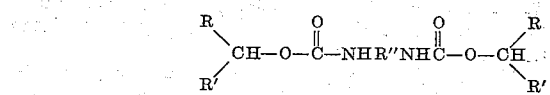

If either R or R' contain another hydroxy group, further reaction with an additional diisocyanate molecule can take place, and the process can continue with the formation of a linear polymeric urethane. If the hydroxyl bearing component contains more than two hydroxyls, as in the case of starch, cross-linkage between chains is possible.

Since moisture present in the reaction zone has a tendency to transform the isocyanates into the corresponding substituted ureas, the process is preferably carried out under anhydrous conditions. With this practical limitation, the presence of minor amounts of water is not objectionable. Dry starch may be used, or starch of normal moisture content may be dried conveniently in the reactor by distilling the starch with a liquid which forms a constant boiling mixture with water. Examples of such liquids are hydrocarbons, such as benzene, toluene, or tertiary bases, such as pyridine. The starch may be the whole starch or a starch fraction from any natural source, such as corn, wheat, white potato, sweet potato, tapioca, or the like.

The reaction between the starch and isocyanate proceeds satisfactorily using an inert solvent as a reaction medium. The liquid employed may be the same as that used to remove water azeotropically from the starch. Pyridine or other tertiary bases are preferred as a reaction medium, although the other solvents mentioned above may be used.

The reaction is preferably carried out at elevated temperature, although it proceeds satisfactorily at any temperature within the range of about from 25° C. to the reflux temperature of the solvent used. The temperatures of about 100° C. have been found convenient, the reaction at that temperature being rapid.

Starch esters may be made using either monoisocyanates, such as phenyl isocyanate, or polyisocyanates, for example, hexamethylene diisocyanate. The degree of esterification may be controlled by controlling the reacting proportions, and it is possible to obtain esters varying from a low degree of esterification to complete esterification. For instance, using low ratios of phenyl isocyanate to starch, products are obtained which contain relatively few carbanilyl groups per anhydroglucose unit. If the ratio is greater than 1 carbanilyl group for every 6 anhydroglucose units, the products no longer swell or form a paste in hot water. On the other hand, if excess phenyl isocyanate is used, completely substituted products are obtained, corresponding to the trisubstituted esters.

In incompletely esterified starch compounds the granular structure of the starch is usually retained. In the trisubstituted compounds the granular structure disappears, and the products are amorphous white powders.

When starch is reacted with diisocyanates, for example, with hexamethylene diisocyanate, only a relatively small amount of ester groups introduced suffices to change the properties of the starch so that it no longer forms a paste in boiling water. This insolubilization takes place without appreciable microscopic change in the appearance of the starch granules. Starch derivatives falling within the scope of this invention which contain still less ester groups in the molecule tend to exhibit intermediate swelling characteristics.

The products are quite resistant, chemically and physically, to modification. For instance, they are resistant to swelling. An 0.25N alcoholic alkali solution, which completely saponifies such esters as starch acetate at room temperature in 24 hours, has substantially no effect on the compounds of this invention.

The products of this invention swell only slightly in 90 percent formic acid, 0.5 normal alkali, 4 molar calcium chloride solution, 4 molar zinc chloride solution, and 4 molar ammonium thiocyanate solution. All of these reagents effect complete gelatinization of unmodified starch.

The pH of aqueous suspensions of the new starch compounds approximates neutrality, ranging in general between 6.4 and 7.6.

The new starch products of this invention, that is, the incompletely esterified granular starch compounds, and the amorphous trisubstituted compounds, are usually finely divided, stable, white powders. They may be used as fillers, extenders, insecticide bases, adsorbents, dusting powders for surgical rubber gloves, or for other purposes where an inert finely divided organic material is suitable.

The following specific embodiments of the invention are to be considered as illustrative only.

*Example 1*

Twenty-five grams of air-dried corn starch was suspended in 150 ml. of dry pyridine. Distillation was carried out, using a fractionating column, until the temperature of the distilling vapors was 113° C. Dry pyridine was added to replace the pyridine-water azeotrope that distilled. To this dried starch suspended in pyridine was added all at once 2 ml. of distilled hexamethylene diisocyanate. Reaction was carried out for 6 hours at 100° C. with stirring. No visible change occurred during this heating period. If the stirrer was stopped, the product settled out. The mixture was allowed to cool, and was then poured into 300 ml. ethanol. The product was separated by filtration, washed several times with ethanol, and dried.

This reaction product was practically indistinguishable microscopically from the original starch, and contained 1.15 percent nitrogen, calculated on a dry basis, when analyzed by the Kjeldahl procedure. This corresponds to one hexamethylene dicarbamyl group for every 14 anhydroglucose units. This product did not form a paste in boiling water (5 minutes), although the granules were somewhat swollen when examined microscopically and no longer showed a typical "cross" when viewed in polarized light. The powder, dusted on surgical rubber gloves, did not become sticky on one-half hour sterilization at 120° C.

*Example 2*

Reaction was carried out as in Example 1 but 10 ml. hexamethylene diisocyanate was used. The product contained 2.31 percent nitrogen on a dry basis, which corresponds to one hexamethylene dicarbamyl group for every 6 or 7 anhydroglucose units. This product swelled hardly at all in 5 minutes in boiling water and some birefringence in polarized light was still discernible.

*Example 3*

Reaction was carried out as in Example 1, using 10 grams starch and 40 grams phenyl isocyanate. The product, which was soluble in the esterification mixture, contained 8.07 percent nitrogen on a dry basis, corresponding to a trisubstituted product. It is a white powder, insoluble in water and ethanol, but soluble in pyridine, dioxane, and morpholine. A 1 percent solution of this powder in pyridine had an optical rotation for the yellow sodium line at 25° C. ($[\alpha]_D^{25}$) of $-66.2°$.

The rate of reaction of phenyl isocyanate with starch granules is rapid at 100° C. After 15 minutes' reaction time more than 3 percent nitrogen is present in the product. The reaction is complete to the triester stage in 4 hours.

If an insufficient amount of phenyl isocyanate for complete esterification is added, starch derivatives with varying properties can be obtained. A product containing 0.06 or less carbanilyl group per $C_6$ unit has a starch "A" X-ray diffraction pattern and is indistinguishable microscopically from the original starch. As more groups are introduced the hilum becomes enlarged, the granule structure finally is destroyed, and amorphous portions appear. New lines appear in the X-ray patterns. Reaction of phenyl isocyanate with starch is probably uniform, since pyridine extraction of a product containing 0.9 group per $C_6$ gave a soluble and an insoluble fraction having identical nitrogen contents.

*Example 4*

Reaction was carried out as in Example 1 but 2 ml. of distilled toluene 2,4-diisocyanate was used as the reagent. A product having properties similar to those of the product of Example 1 resulted. This starch ester contained 1.15 percent N calculated on a dry basis.

*Example 5*

Reaction was carried out as in Example 1 but using 10 ml. of distilled toluene 2,4-diisocyanate as the reagent. A product similar to that of Example 2 resulted. This ester contained 1.84 percent N, calculated on a dry basis.

*Example 6*

Twenty-five grams of corn starch was dried azeotropically with toluene and reacted in dry toluene (150 ml.) with 5 ml. of distilled toluene 2,4-diisocyanate for 6 hours at 100° C. The product formed a paste with water, although it was not as easily wet by water as was the original starch. This product contained 0.08 percent N, calculated on a dry basis.

*Example 7*

Reaction was carried out as in Example 1 but 8 ml. of phenyl isocyanate was used as the reagent. The product contained 3.28 percent N, corresponding to approximately 1 carbanilyl grouping for every two anhydroglucose residues. The product microscopically, consisted of mostly amorphous material with some granules mixed with it. This product did not form a paste in hot water. If only 2 ml. of phenyl isocyanate is used, 1 acyl group for every 16 anhydroglucose residues is introduced. This product swells in hot water.

In a manner similar to Example 3 the trisubstituted derivative of amylose and amylopectin was produced using phenyl isocyanate. The products were white powders insoluble in water, but soluble in such organic solvents as pyridine, dioxane, and morpholine. They do not swell in water. A 1 percent solution of the amylose derivative in pyridine had an optical rotation for the yellow sodium line at 25° C. ($[\alpha]_D^{25}$) of —82.3°. A 1 percent solution of the amylopectin derivative in pyridine had an optical rotation for the yellow sodium line at 25° C. of —62.1°.

Likewise, the trisubstituted derivative of starch, amylose, and amylopectin was produced by procedure similar to the above employing a-naphthyl isocyanate. The products were white powders, insoluble in water and the common organic solvents. They were slightly swollen by dioxane, pyridine, and morpholine. A 1 percent solution of these a-naphthyl carbamate esters in pyridine had the following optical rotations:

$[\alpha]_D^{26} = +40.1$ (starch)
$[\alpha]_D^{26} = +36.2$ (amylopectin)
$[\alpha]_D^{25} = +50.2$ (amylose)

To illustrate the non-swelling properties of the starch derivatives, two-gram samples of the various starch derivatives were heated at 100° for 20 minutes with 40 ml. of water with stirring. The mixtures were allowed to settle for 24 hours. The results are summarized in the following table:

| Material | cc. settled | Average granule size in microns |
|---|---|---|
| Control starch (not heated) | 3 | 7.8 |
| Control starch (heated) | 40 | (³) |
| Formaldehyde starch | 5½ | ¹ 14.1 |
| Product of Example 1 | 12 | ¹ 13.2 |
| Product of Example 2 | 3½ | ² 10.7 |
| Product of Example 4 | 6 | ² 11.3 |
| Product of Example 5 | 5½ | ² 11.9 |
| Commercial swelling-resistant "Starch product A" | 9 | ¹ 13.3 |
| Commercial swelling-resistant "Starch product B" | 13½ | ¹, ² 20.3 |
| Commercial swelling-resistant "Starch product C" | 25½ | ¹, ² 25.7 |

¹ No longer birefringent under polarized light.
² Retained birefringence under polarized light.
³ These products were degraded by amylase. The others in this tabulation were unaffected.

Of particular interest is the characteristic of the starch derivatives which makes possible the separation of the starch into linear and branch chain components by selective solvent action. The associative forces between the fractions are apparently disrupted rather completely by phenyl isocyanate for such a separation to be possible. This enables a cleancut fractionation of starch into the amylose carbanilate and amylopectin carbanilate. The amylose ester for instance is soluble in ethyl acetate at room temperature, whereas the amylopectin ester is not.

Having described my invention, I claim:

1. A starch carbamate powder containing at least one carbamyl group for every 14 anhydroglucose units, characterized in that it is substantially non-swelling or paste-forming in hot water and in that an aqueous suspension thereof has a pH of about from 6.4 to 7.6.

2. The starch carbamate of claim 1 wherein the carbamyl groups comprise the acyl groups of organic carbamic acids selected from the group consisting of monocarbamic acids and dicarbamic acids.

3. The starch carbamate of claim 1 wherein the carbamyl groups comprise the acyl groups of organic monocarbamic acids.

4. The starch carbamate of claim 1 wherein the carbamyl groups comprise the acyl groups of organic dicarbamic acids.

5. The powder of claim 1 wherein the starch carbamate is a starch carbanilate.

6. The powder of claim 1 wherein the starch carbamate is a starch hexamethylene dicarbamate.

7. The powder of claim 1 wherein the starch carbamate is a starch toluene 2,4-dicarbamate.

8. A process comprising reacting starch granules in natural form with an organic isocyanate selected from the group consisting of monoisocyanates and diisocyanates in an inert solvent medium under substantially anhydrous conditions and at a temperature of about from 25° C. to the reflux temperature of the solvent to form a starch carbamate, separating the formed starch carbamate, and drying it to a powder.

9. The process of claim 8 wherein the organic isocyanate is phenyl isocyanate.

10. The process of claim 8 wherein the organic isocyanate is hexamethylene diisocyanate.

11. The process of claim 8 wherein the organic isocyanate is toluene 2,4-diisocyanate.

12. The process of claim 8 wherein the reaction temperature is about 100° C.

IVAN A. WOLFF.

REFERENCES CITED

The following references are of record in the file of this patent:

UNITED STATES PATENTS

| Number | Name | Date |
|---|---|---|
| 2,284,896 | Hanford et al. | June 2, 1942 |
| 2,476,107 | Moyer | July 12, 1949 |
| 2,520,963 | Reeves | Sept. 5, 1950 |